US 8,991,854 B2

(12) United States Patent
Greger et al.

(10) Patent No.: US 8,991,854 B2
(45) Date of Patent: Mar. 31, 2015

(54) FOLDING TRAVEL STROLLER LATCH AND WHEEL POSITIONING SYSTEM

(71) Applicant: Artsana USA, Inc., Lancaster, PA (US)

(72) Inventors: Jeff G. Greger, Lititz, PA (US); Matthew J. Ransil, Richland, PA (US)

(73) Assignee: Artsana USA, Inc., Lancaster, PA (US)

( * ) Notice: Subject to any disclaimer, the term of this patent is extended or adjusted under 35 U.S.C. 154(b) by 0 days.

(21) Appl. No.: 14/252,803

(22) Filed: Apr. 15, 2014

(65) Prior Publication Data

US 2014/0327233 A1 Nov. 6, 2014

Related U.S. Application Data

(60) Provisional application No. 61/818,609, filed on May 2, 2013.

(51) Int. Cl.
*A63C 9/00* (2012.01)
*B62B 3/02* (2006.01)
*B62B 7/08* (2006.01)
*B62B 7/06* (2006.01)

(52) U.S. Cl.
CPC . *B62B 3/022* (2013.01); *B62B 7/08* (2013.01); *B62B 2205/003* (2013.01); *B62B 2205/12* (2013.01); *B62B 7/062* (2013.01); *B62B 7/064* (2013.01)
USPC ....................................................... 280/650

(58) Field of Classification Search
USPC ......... 280/33.993, 47.38, 639, 642, 643–644, 280/647–650, 658
See application file for complete search history.

(56) References Cited

U.S. PATENT DOCUMENTS

| | | | |
|---|---|---|---|
| 4,637,093 A | 1/1987 | Kassai | |
| 4,649,596 A | 3/1987 | Kassai | |
| 4,706,986 A | 11/1987 | Kassai | |
| 4,732,406 A | 3/1988 | Kassai | |
| 4,746,140 A | 5/1988 | Kassai | |
| 4,779,304 A | 10/1988 | Kassai | |
| 4,805,259 A | 2/1989 | Kassai | |
| 4,845,805 A | 7/1989 | Kassai | |
| 5,517,718 A | 5/1996 | Eichhorn | |
| 6,682,090 B2 | 1/2004 | Chen | |
| 6,910,708 B2 | 6/2005 | Sack et al. | |
| 6,964,083 B2 | 11/2005 | Nagai et al. | |
| 7,213,818 B2 | 5/2007 | Chang | |
| 7,258,353 B2 | 8/2007 | Liao | |
| 7,422,230 B2 | 9/2008 | Chuan | |
| 8,297,643 B2 | 10/2012 | Funakura | |
| 8,328,226 B2 | 12/2012 | Xu-Hui et al. | |
| 8,448,976 B2 | 5/2013 | Funakura | |
| 8,807,587 B2 * | 8/2014 | Funakura | 280/642 |
| 2006/0237949 A1 | 10/2006 | Hou et al. | |
| 2007/0164538 A1 | 7/2007 | Yeh | |
| 2011/0074124 A1 * | 3/2011 | Schnarr et al. | 280/30 |
| 2013/0240577 A1 | 9/2013 | Li et al. | |

* cited by examiner

*Primary Examiner* — John Walters
*Assistant Examiner* — James Triggs
(74) *Attorney, Agent, or Firm* — Andrew D. Mead (57) ABSTRACT

A foldable frame for a stroller having front and rear legs with wheels disposed at the ends thereof and a handle support joined at a folding mechanism. The folding mechanism synchronizes motion of the front leg and handle to collapse them adjacent to the rear leg. The mechanism also actuates a swivel mechanism on a front wheel that swivels the front wheel to a predetermined position optimized to allow the stroller to be supported by the wheels when folded.

19 Claims, 13 Drawing Sheets

FIG. 15

FOLDING TRAVEL STROLLER LATCH AND WHEEL POSITIONING SYSTEM

CROSS REFERENCE TO RELATED APPLICATIONS

This application claims the benefit of priority of U.S. Provisional Application 61/818,609, filed May 2, 2013.

BACKGROUND OF THE INVENTION

The present invention relates generally to the field of child strollers. More particularly, the present invention relates to a foldable stroller that includes an improved latch and mechanism for properly positioning swivel front wheels to increase compactness of the stroller when folded and increase the ease with which the stroller may be deployed and folded for stowage.

Even though foldable strollers have been in production for quite some time, efforts to improve the ease with which they may be folded for stowage and increase the compactness of the folded stroller constantly continues. Mechanisms to coordinate folding movement of the legs and handle extensions as the stroller is folded and easily-releasable latches allowing the folding operation to commence have dramatically improved the ease of use over the years. One area of focus has been in mechanisms that allow the stroller to be collapsed for stowage requiring only one hand to operate. Another area of focus involves optimizing stroller frame configuration, especially swivel wheel position, so that a folded stroller frame is as compact as is possible.

It would be advantageous to provide a foldable stroller that can be folded using a simple, one-handed operation which releases the latch, folds the stroller frame in a coordinated manner, and positions swivel wheels for maximum compactness while allowing the folder stroller to stand upright in the folded condition.

SUMMARY OF THE INVENTION

According to one embodiment of the present invention, a stroller having forwardly extending right and left side front wheel supports with at least one forwardly disposed wheel connector, rearwardly extending right and left side rear wheel supports with rearwardly disposed wheel connectors, and upwardly extending right and left side handle supports terminating in one or more handles at the upper end are interconnected by right and left side folding mechanisms to form a collapsible frame. The folding mechanisms synchronize movement of respective front wheel supports, rear wheel supports, and handle supports as the stroller frame is moved between collapsed and deployed positions. Right and left side latchable, articulated links interconnect respective front and rear wheel supports; the articulated links maintain the stroller in a deployed position when latched, and allow the stroller to be folded when unlatched. A handle disposed between the right and left side articulated links and pivotal about a transverse axis connects to right and left side latch pins. The handle is moveable between first and second positions, movement from the first to the second position causes the latch pins to move from engaged to disengaged positions thereby unlatch the articulated links. The latch pins are biased toward the engaged positions such that when the handle is returned to the first position, the latch pins will be released and the biasing element will move the latch pins toward the engaged position to engage when the articulated link is positioned as when the stroller is deployed. Grasping the handle by a user moves the handle so that the latch pins are disengaged, allowing the stroller frame to fold as the user continues to lift the handle upwardly.

Another embodiment of the present invention provides a stroller having forwardly extending right and left side front wheel supports with at least one forwardly disposed wheel connector, rearwardly extending right and left side rear wheel supports with rearwardly disposed wheel connectors, and upwardly extending right and left side handle supports terminating in one or more handles at the upper end. Left and right side folding mechanisms are provided at the forward end of the rear wheel supports. The front wheel and handle supports are each pivotally connected to respective folding mechanisms to form a collapsible frame. The folding mechanisms synchronize movement of respective front wheel supports, rear wheel supports, and handle supports as the stroller frame is moved between collapsed and deployed positions. Each folding mechanism comprises a slider that moves between opposing first and second positions with one or more links connecting the slider to ends of the respective front wheel and handle supports to synchronize support movement allowing collapse of the stroller. The front wheel is provided with a generally vertically oriented swivel connection allowing the wheel to be steered. A ramped cam symmetrically oriented around the swivel connection is connected to the front wheel for swivel motion therewith. A spring-load plunger interacting with the cam orients the direction of the front wheel to a desired swivel (angular) position when engaged. A pull link connecting the plunger and the slider is tensioned when the stroller is deployed, preventing the plunger from contacting the cam, thereby allowing the front wheel to swivel freely. Folding the stroller causes movement of the slider which allows the pull link to release tension on the plunger so that it interacts with the cam, forcing the front wheel to the desired position. The front wheel position mechanism can be used on a single front wheel or on strollers having right and left side front wheels.

Additional advantages and objectives of various aspects and embodiments of the present invention are discussed below.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "up" or "down," "right" or "left," or "top" or "bottom" are used as a matter of mere convenience, and are determined as the stroller would normally be pushed by a user across the floor or a similarly level surface while in an operating position. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Furthermore, when referring to the figures, like parts are numbered the same in all of the figures. Inclusion of an "R" or an "L" designation in conjunction with a reference number signifies an item shown on the right or left side of the stroller, respectively. Use of the reference number sans "R" or an "L" designation refers to the item generically without regard to a particular orientation.

Figure 1:
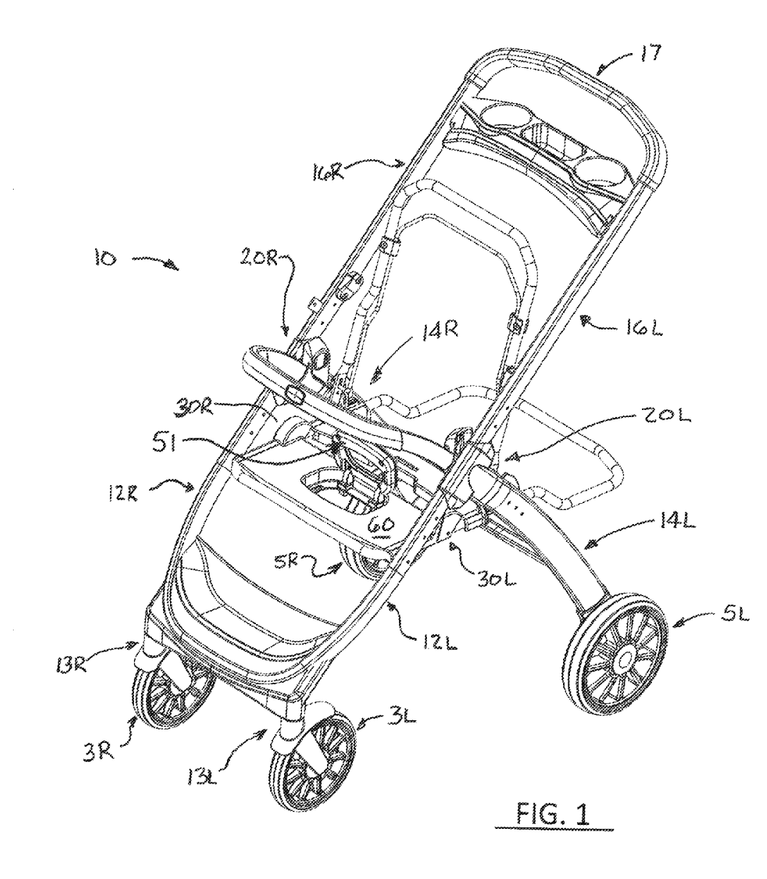
FIG. 1 is a perspective view of the frame of a conventional folding stroller of the type on which the present invention is useful.
Figure 2:
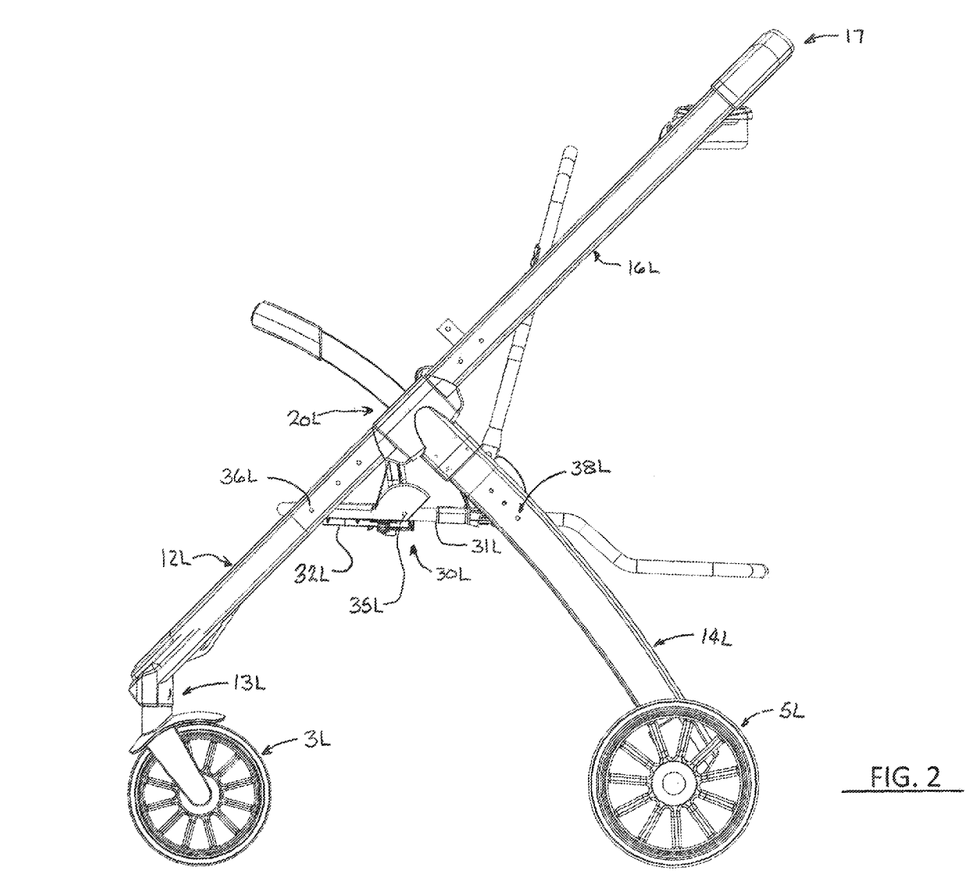
FIG. 2 is a left side elevation view of the folding stroller frame of FIG. 1 in an unfolded or deployed position.

Referring to FIGS. 1 and 2, a foldable stroller frame 10 is shown comprising forwardly extending right and left side front legs 12R, 12L with at least one forwardly disposed wheel connector 13R, 13L, rearwardly extending right and left side rear legs 14R, 14L with rearwardly disposed wheel connectors, and upwardly extending right and left side handle supports 16R, 16L terminating in one or more handles 17 at the upper end. The legs and handle supports are interconnected by right and left side folding mechanisms 20R, 20L to form the main portion of the collapsible stroller frame. Frame 10 is supported by one or more front wheels 3R, 3L and a pair of transversely spaced-apart rear wheels 5R, 5L. The front wheel connectors 13L, 13R permit the front wheels to swivel about generally upstanding axes so that the stroller may be steered by a user.

Figure 3:
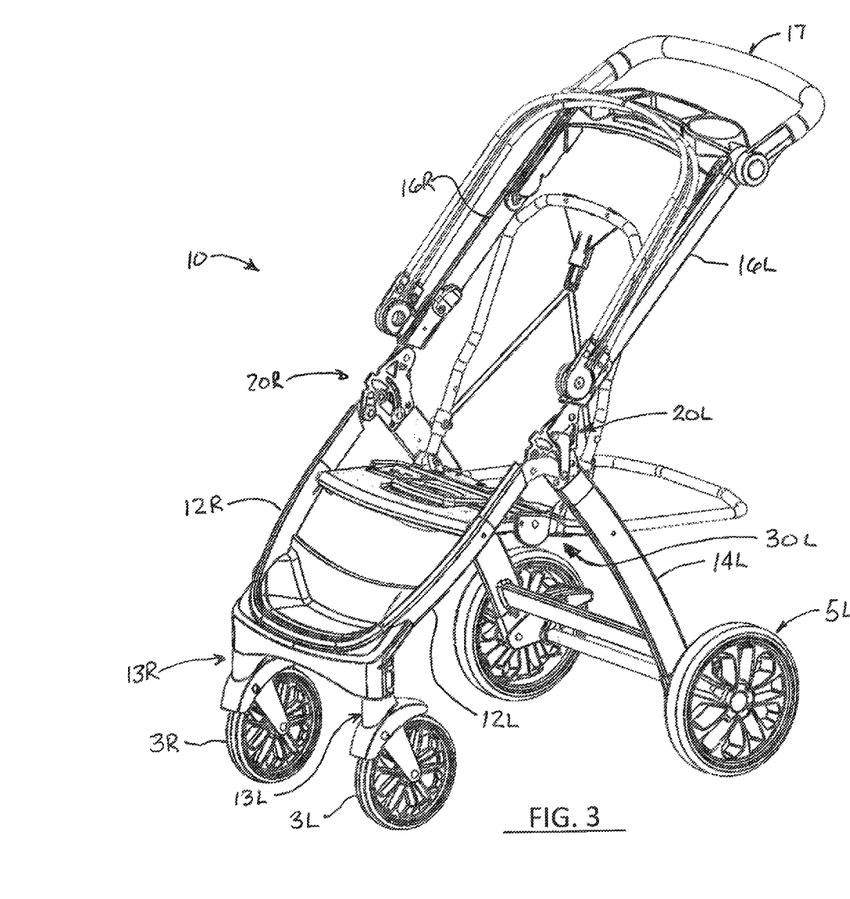
FIG. 3 is a partial perspective view of the folding stroller frame of FIG. 1 in a fully deployed position for use.

The folding mechanisms 20R, 20L synchronize movement of respective front legs 12, rear legs 14, and handle supports 16 as the stroller frame 10 is moved between the collapsed position (see FIG. 7) and the deployed position (FIGS. 1-3). A first embodiment of a folding mechanism, best shown in FIGS. 8 and 9, includes a base plate 21 connected to a respective rear leg 14 which provides pivoting connections 23A, 23B for the front legs and handle supports 12, 16 arranged to permit folding movement of the legs and handle supports generally in a single plane. Each front leg 12 includes an end connector 121 which includes provisions to pivotally connect at connection 23B, preferably holes through which a rivet or bolt extends. Similarly, handle support 16 includes an end connector 161 which provides a connection for pivoting connection 23A. Each end connector includes an offset connection 123, 163 which is spaced-apart from the respective pivot connections 23 and the axis of the respective leg or handle support. Synchronizing links 125, 165 are pin-connected connected at one end to the respective offset connections 123, 163 and to a common connection point at connector 25. The shared connector 25 extends through an elongate, slot-like sliding aperture 27 in the base plate 21, preferably aligned with the longitudinal axis of rear wheel support 14, so that movement of the sliding connector 25 is limited to linear movement in either direction in the axis of the sliding aperture 27. The common connection of the synchronizing links 125, 165 to the sliding connector 25 and to respective offset connections 123, 163 causes simultaneous pivoting movement of the front legs and the handle supports, should either one be pivoted. The offset spacing between the respective pivot connections 23 and the offset connections 123, 163 establishes the relative pivotal movement of the front legs and handle supports; equal offsets provides equal pivotal movement. Differences in offset spacing can be used to cause the front legs to pivot at a rate differing from the handle support.

Figures 10, 11:
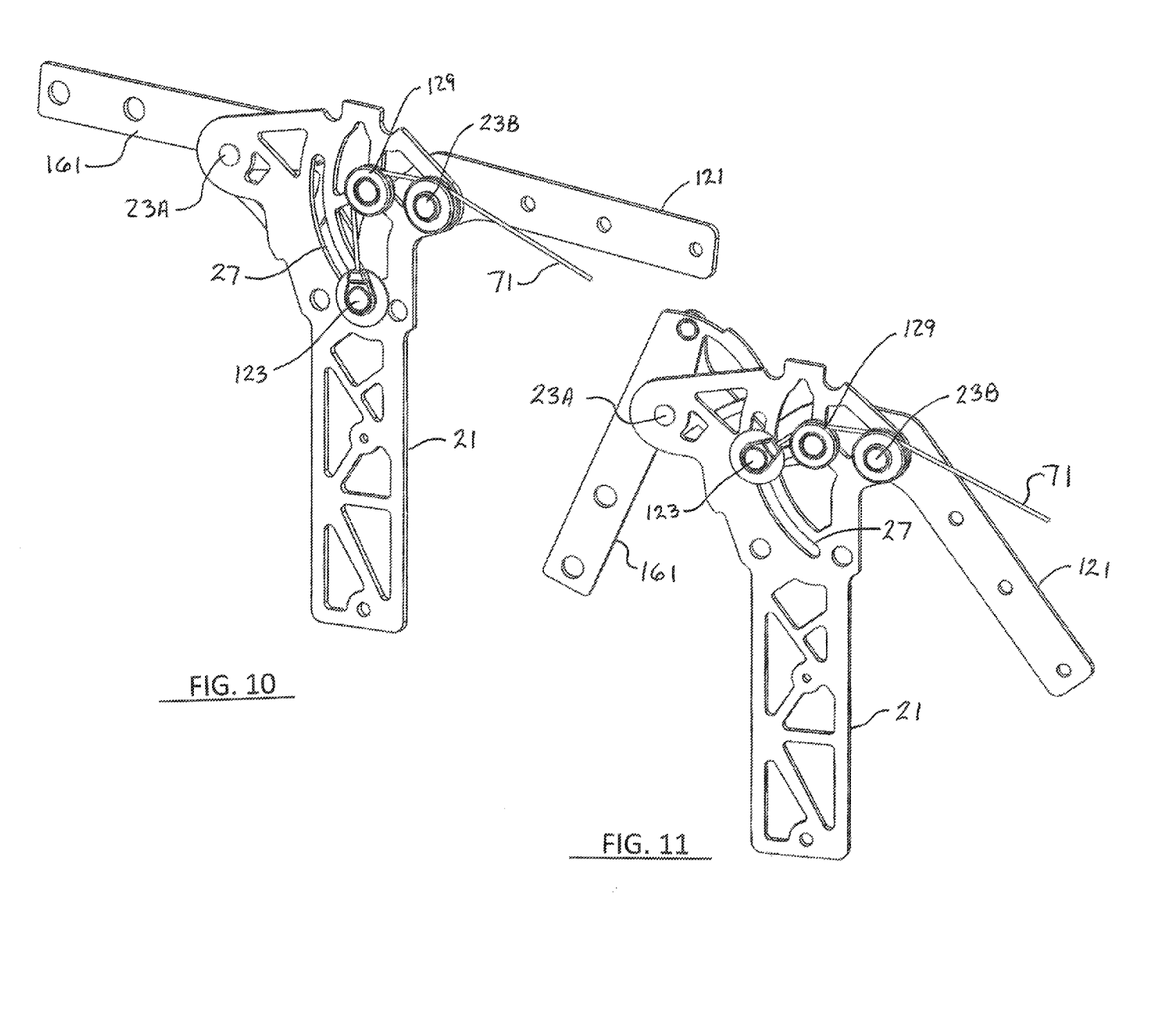
FIGS. 10 through 12 show a second embodiment of a folding mechanism useful on the stroller frame in a deployed position and a partially folded position.
Figure 12:
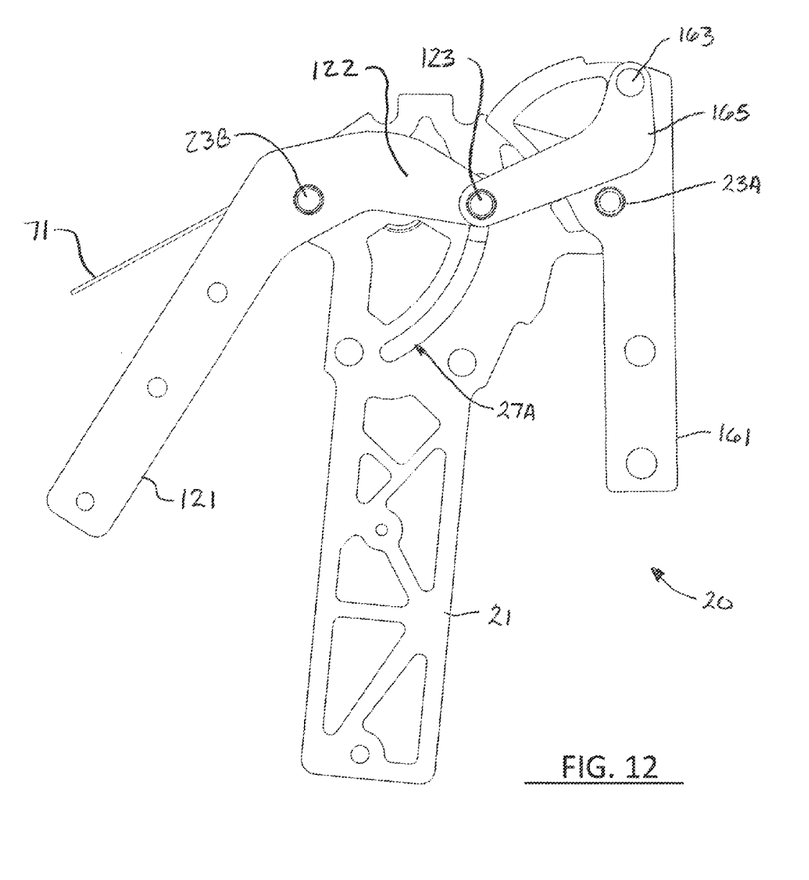
Figure 13:
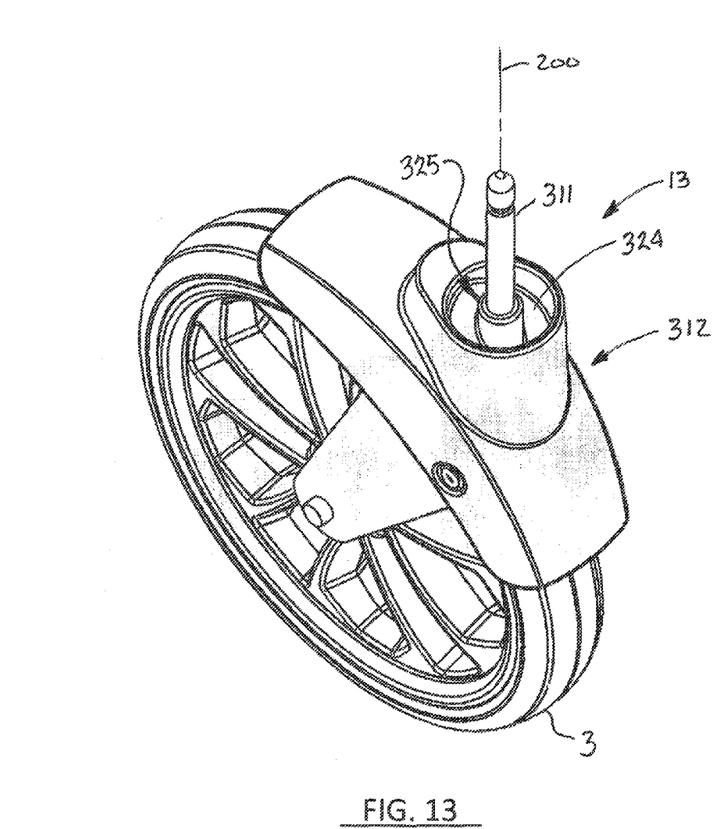
FIGS. 13 through 16 show the front wheel swivel positioning mechanism.
Figure 14:
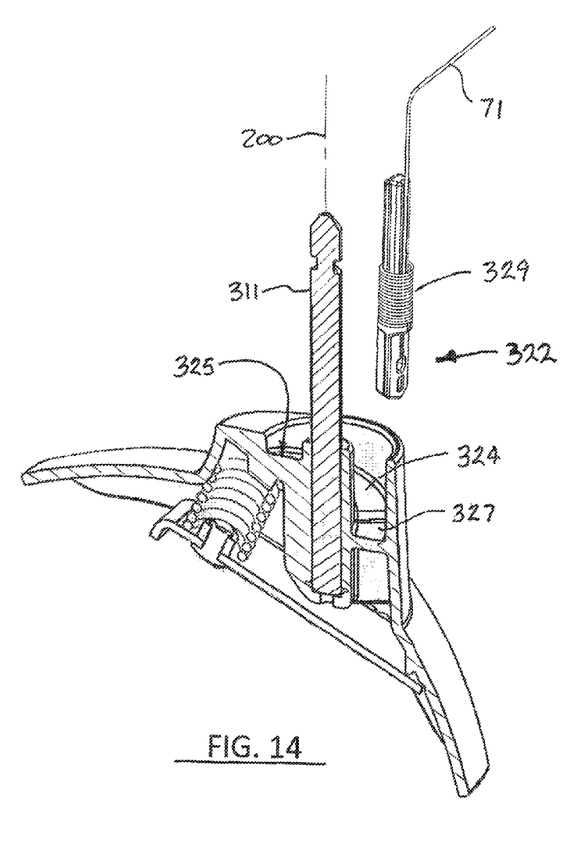
Figure 15:
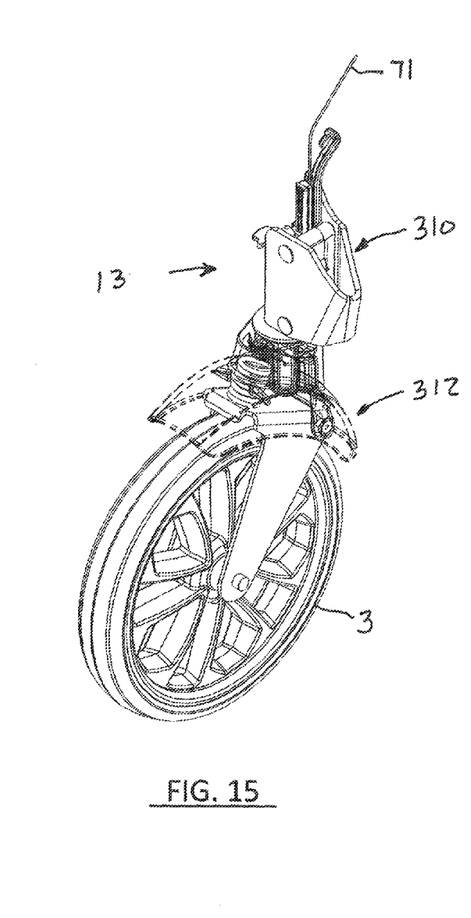

A second embodiment of the folding mechanism 20 is illustrated in FIGS. 10 through 12. In this embodiment, one of the synchronizing links is eliminated (first link 125 from the first embodiment illustration). The remaining synchronizing link 165 is pivotally connected to the offset connection 123 of the end connector 121 as previously described. Sliding aperture 27A is modified from the linear slot-like configuration as previously described to an arc shape corresponding to the path of offset connection 123 as the first end connector 121 pivots about pivot connection 23B from the deployed position (FIG. 10) toward a collapsed position (FIG. 11). As movement of the offset connector 123 is defined by the arc sweep of offset arm 122, sliding aperture 27A is not essential to guiding movement of the offset connection 123, but instead provides additional stability to the mechanism. Variation of the pivoting rate between the front leg and the handle support is achieved by varying the offset spacing between the respective pivot connections 23A, 23B and the respective offset connections 123, 163. As illustrated, the rate of pivoting movement of the handle support (end connector 161) is greater than the rate of pivoting movement of the front leg (end connector 121) as a result of the smaller offset of handle offset connection 163 compared to front wheel offset connection 123.

Figures 17, 18:
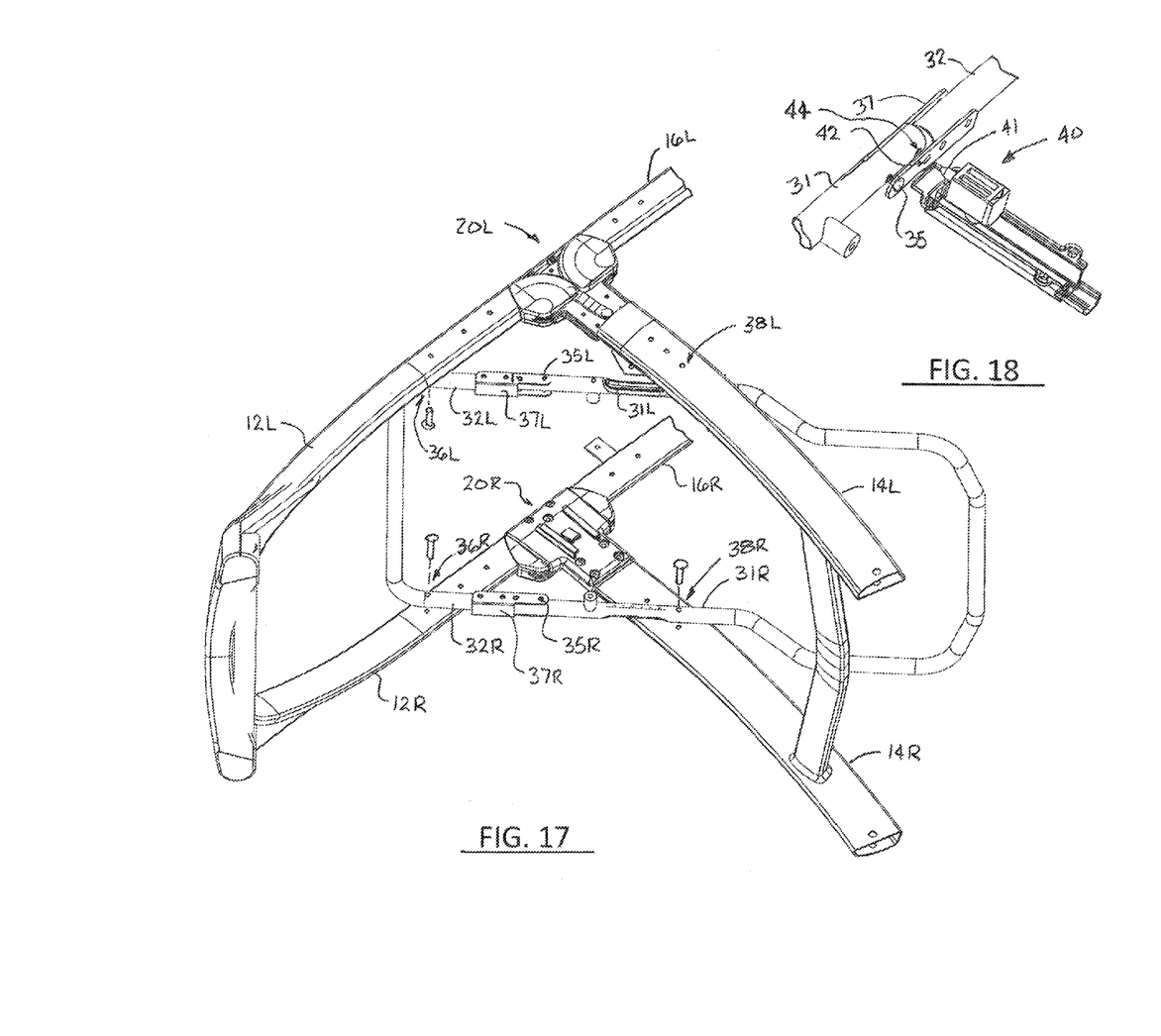
FIG. 17 is a lower perspective view of the frame of the folding stroller highlighting articulated links which controls frame folding and deployment for use.
FIG. 18 is a detail view of the latching mechanism for retaining the articulated linkage in a deployed for use position.

Referring to FIGS. 17 and 18, the stroller movement between deployed and folded positions is further controlled by right and left side latchable, articulated links 30R, 30L which interconnect respective front and rear legs 12, 14. Each articulated link 30 comprises a first portion 31, a second portion 32, and an intermediate pivot connection 35. The link portions are pivotally connected to respective front and rear legs at front and rear link connections 36, 38, respectively. Intermediate pivot connections 35R, 35L are mounted on stop brackets 37L, 37R which are rigidly connected to a rearward end of the second link portions 32 and pivotally coupled to the forward end of first link portion 31. The lower portion of the stop brackets 37 is configured so that the pivoting movement of first link portions 31 is limited to upward only from a generally linear alignment with second link portion 32. This arrangement provides a generally planar platform or perimeter frame for supporting seat 60 and also maintains the stroller in a deployed position when the articulated links are extended (FIG. 3).

A releasable latch 40, shown in FIG. 18, is provided on each articulated link 30 to retain the articulated links positioned in an extended manner necessary to restrain the stroller frame 10 in the deployed position. Each latch includes a locking pin 41 spring biased to an extended position which engages apertures 42, 44 in the stop bracket 37 and first link portion 31, respectively, to prevent the first link portion from pivoting in relation to the second link portion. A pivoting handle 51 is disposed between the right and left side articulated links 30 and incorporated generally into seating surface 60 (see FIG. 1). The handle 51 is cable connected to each of the locking pins 41 in the latches 40 in a way that raising the handle 51, as shown in FIGS. 4 through 7, tensions the cables to retract the locking pins 41 from their extended position for locking engagement with apertures 42, 44 to a retracted position, shown in FIG. 18, which allows the articulated links to be folded.

Figure 4:
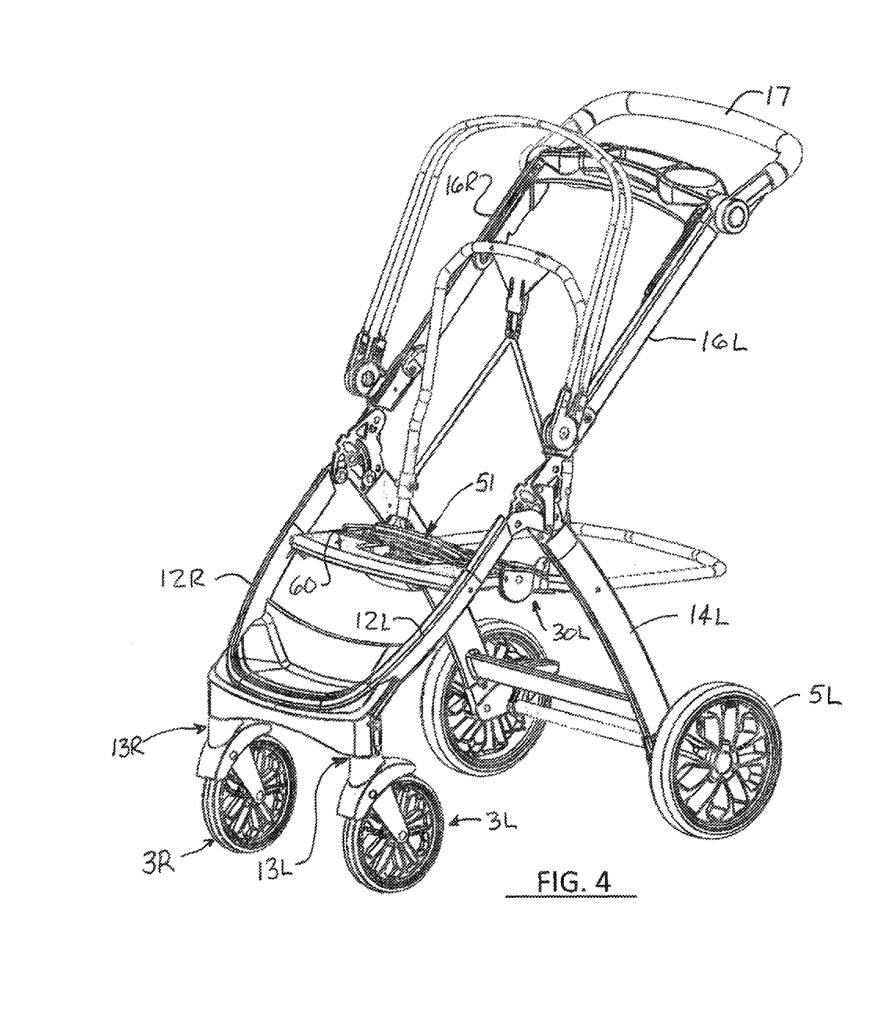
FIGS. 4 through 7 show the folding stroller of FIG. 3 as the folding sequence is initiated and continues until the frame is fully collapsed in a folded position
Figure 5:
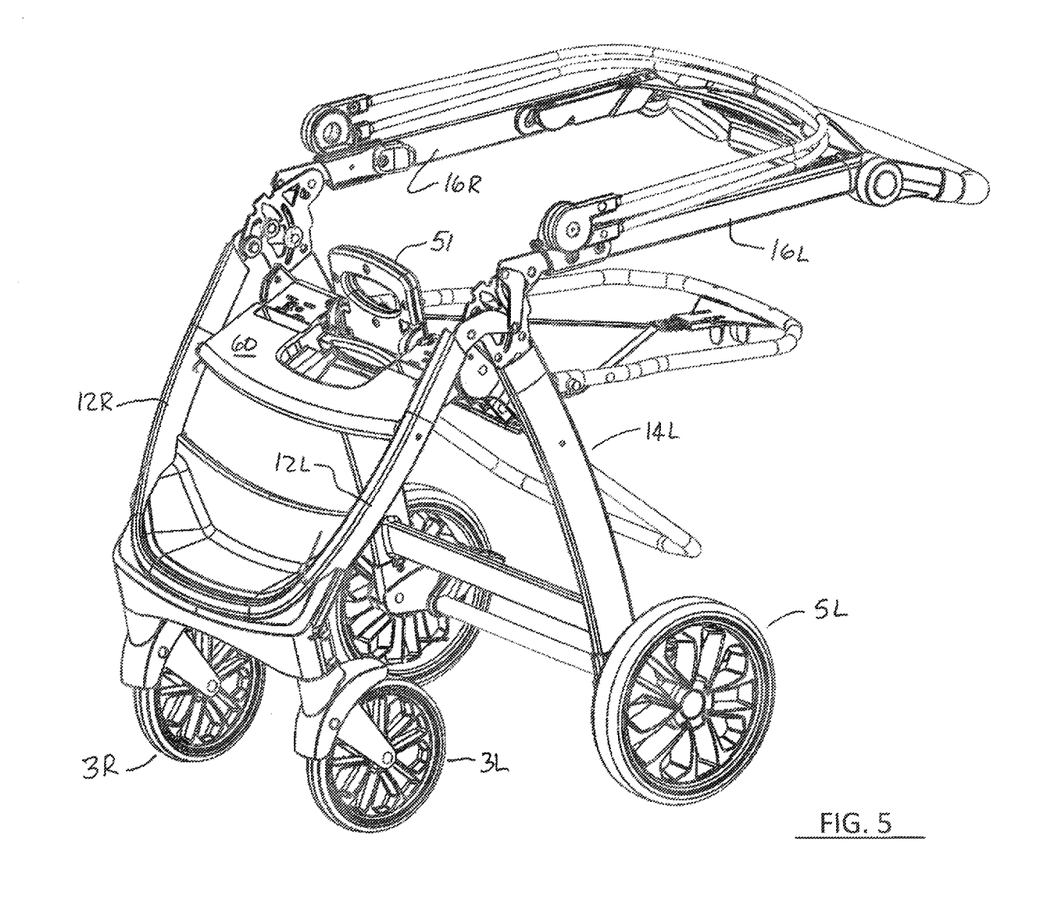
Figure 6:
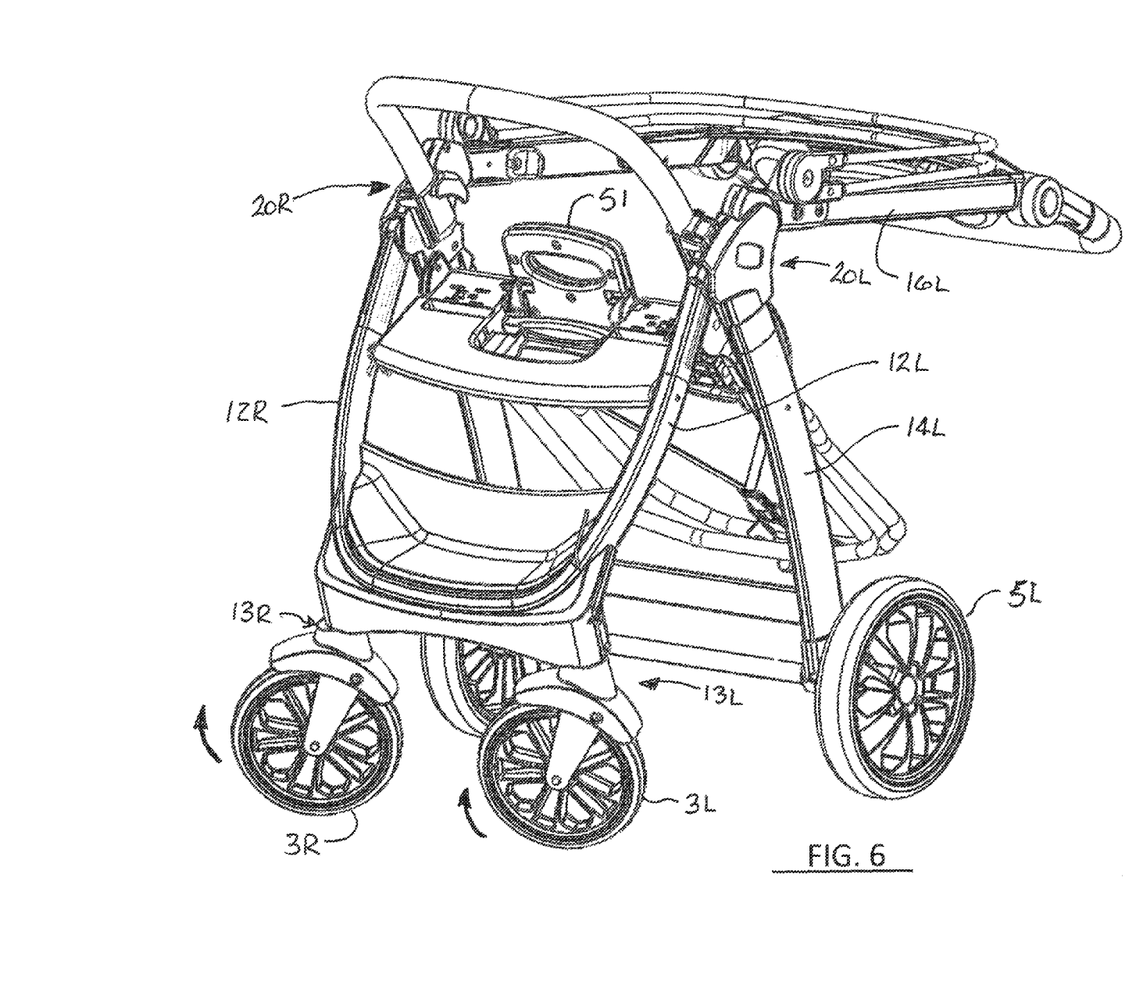
Figure 7:
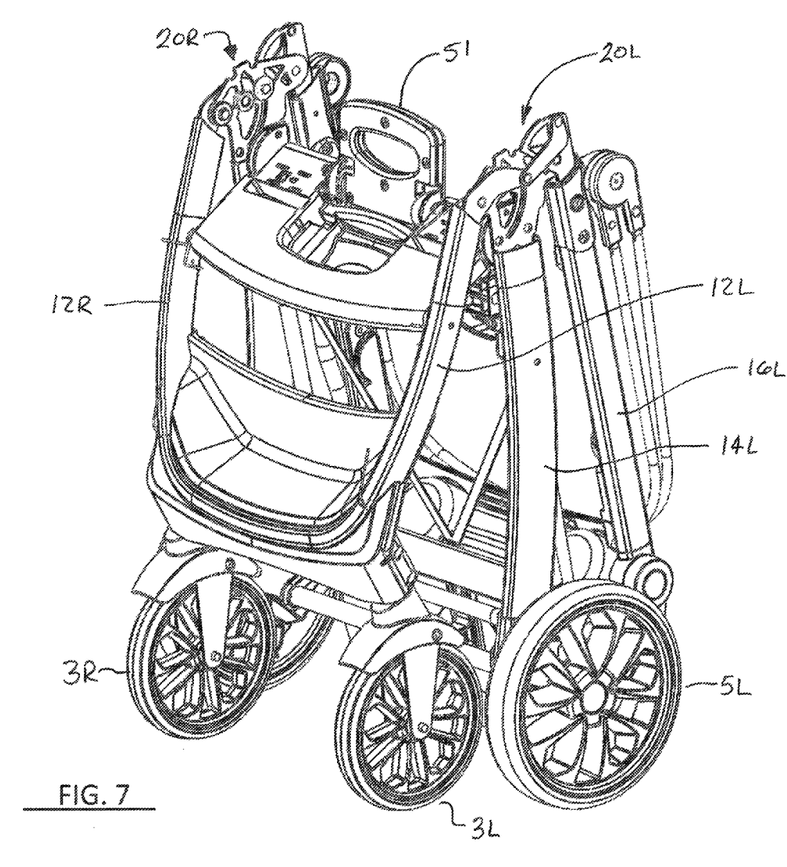
Figure 16:
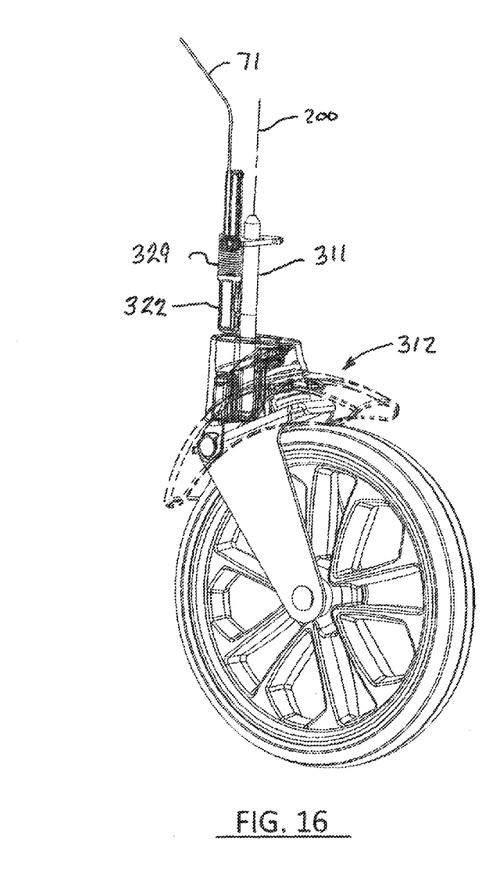

The sequence of stroller folding is illustrated in FIGS. 3 through 7. In FIG. 3, the stroller frame is shown deployed for use. In this position, the articulated links 30 are generally linearly aligned and the latches engaged to prevent the stroller frame from being folded. In FIG. 4, handle 51 is lifted which releases the latches 40 (shown in FIG. 16) and allows the articulated links 30 and stroller frame 10 to begin to collapse. Further upward force on handle 51 causes the stroller frame 10 to continue folding, as shown in FIGS. 5 and 6. Finally, FIG. 7 shows the stroller frame 10 in a fully collapsed position, ready for stowage or transport. Handle 51 remains upwardly positioned to provide a convenient means for lifting the stroller.

Referring to FIGS. 5 through 7, note that the front wheels 3 are turned approximately 180 degrees on their swivels from the generally forward position shown in between FIGS. 5 and 7. This rotation positions the front wheels 3 to enhance stability of the stroller on level ground when the stroller is folded and prevents the front wheels from protruding excessively from the profile of the folded stroller. Rotation of the front wheels is accomplished by a swivel actuator mechanism disposed in each of the wheel connectors 13R, 13L.

Referring to FIGS. 13 through 16, each wheel connector 13 comprises a fixed portion 310 connected to a respective front leg and a swivel portion 312 to which a wheel 3 is rotatably attached. The swivel portion 312 may further include features, such as a suspension to absorb shocks or fenders to protect the swivel mechanism from debris. A generally upstanding swivel axle 311 connects the swivel portion 312 to a receptacle in the fixed portion 310 of the wheel connector 13 and allows the swivel portion 312 to rotate completely about the upstanding swivel axis 200. A sliding plunger 322, moveable between extended and retracted positions by an actuator 71, is biased into the extended or downward position, preferably by a spring 329. The upper portion of the front wheel swivel portion includes a ramped surface 324 radially surrounding the swivel axle 311 and oriented generally orthogonal to the upstanding axis 200. The ramped surface includes a high point 325 and a low point 327 spaced approximately 180 degrees from the high point with the ramp surface 324 being generally consistently sloped therebetween.

When the stroller is in the deployed position, the actuator 71 is tensioned, preferably by movement of the folding mechanism 20, which withdraws the plunger 322 from contact with the ramped surface. In this configuration the front wheels 3 may rotate freely about the swivel axis 200. As the stroller is folded, the tension in actuator 71 is released allowing the plunger 322 to extend and contact the ramp surface 324. The force of the plunger 322 against the ramp surface 324 causes the swivel portion 312 to rotate until the plunger 322 is positioned in the low point 327 of the ramp surface. In the present embodiment, the low point 327 is angularly positioned so that the front wheels are swiveled 180 degrees from the generally forward orientation, though the apparatus could be used to position the front wheels to any desired orientation for folding through the position of the low point 327.

Figures 8, 9:
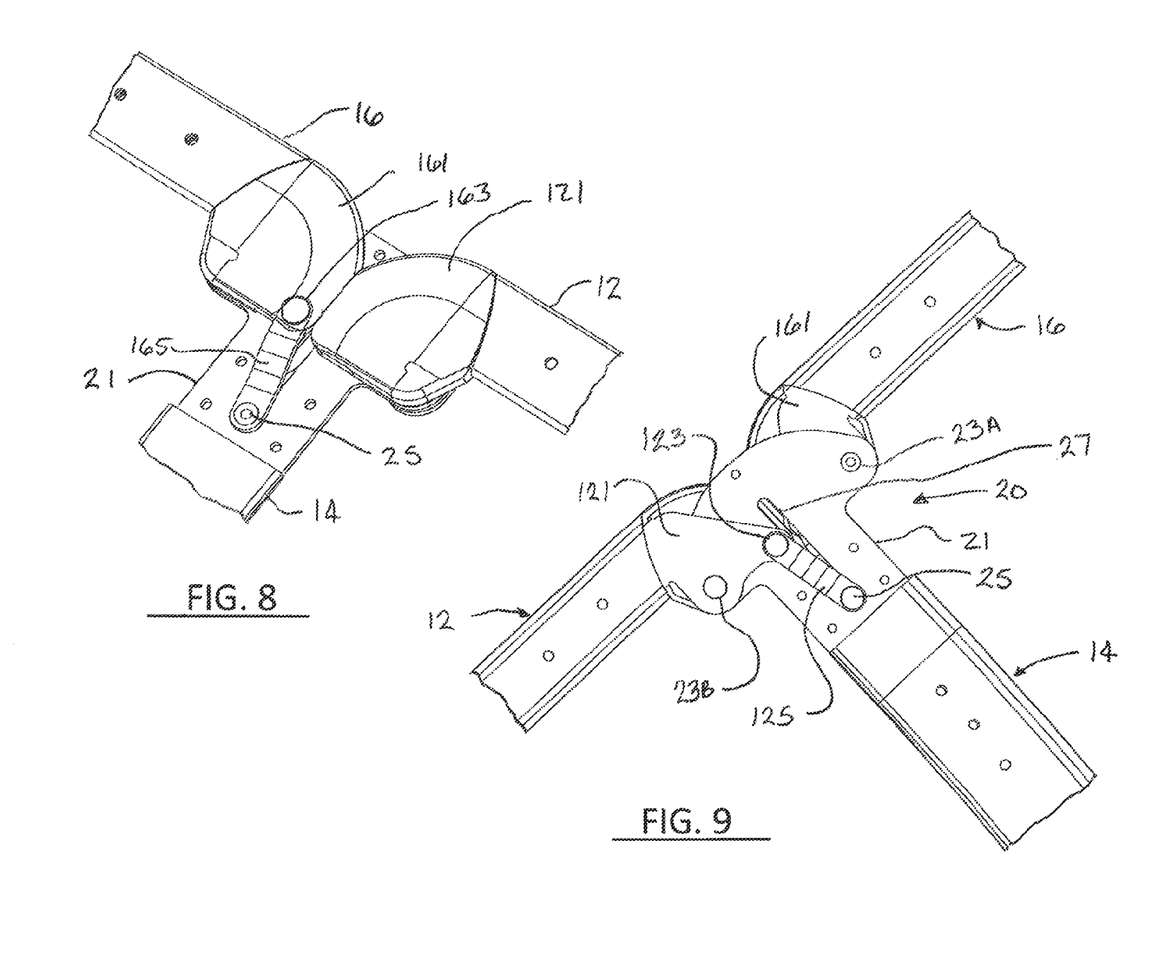
FIGS. 8 and 9 show a first embodiment of a folding mechanism useful on the stroller frame as it would be when the stroller is in a deployed position.

In FIGS. 9 and 11, the motion of the folding mechanism 20 is shown, specifically movement of offset connection 123 can be used to tension the actuator 71 to synchronize repositioning of the front wheels 3 with folding of the stroller. In FIG. 10, the mechanism 20 is shown as it would be positioned when the stroller frame is deployed. In FIG. 11, the mechanism 20 is shown partially folded as would be the case as the stroller frame is being collapsed. Movement of the offset connection 123 is generally toward the idler pulley 129 so that tension in the actuator cable 71 is being reduced with the folding movement. The reduction in tension allows the plunger 322 as described above, to extend and reposition the front wheels 3. Routing of the actuator 71 may require additional pulleys or guides along the path in the front leg to the front wheel connectors 13 as is conventionally known.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

We claim:

1. A foldable stroller frame comprising:
   a frame having a pair of front legs, a pair of rear legs, and a handle;
   right and left folding mechanisms connecting respective front legs, rear legs, and the handle in a manner to synchronize movement thereof between folded and deployed positions; and
   a swivel assembly connecting a front wheel to at least one of the pair of front legs, the swivel assembly enabling rotating movement of the front wheel about a generally upstanding swivel axis and having a cam surface sloped between a high point and a low point encircling the swivel axis, the swivel assembly further having a positioner moveable by an actuator in engaging and releasing directions that, when moved in the engaging direction, contacts the cam surface and rotates the front wheel toward a predetermined position, the actuator connecting to at least one of the folding mechanisms to move the positioner to the engaged position when the stroller is moved from the deployed position toward the folded position.

2. The foldable stroller frame of claim 1, wherein, the positioner, upon making contact with the cam surface when moving in the engaging direction, continues movement in the engaging direction causing the cam to rotate until the positioner rests at the low point at which no further movement in the engaging direction is permitted.

3. The foldable stroller frame of claim 2, wherein the positioner includes a spring to bias the positioner for movement in the engaging direction.

4. The foldable stroller frame of claim 3, wherein the actuator is a cable connecting the at least one folding mechanism and the positioner, the cable being tensioned by the folding mechanism to move the positioner in the releasing direction as the stroller frame is moved toward the deployed position.

5. The foldable stroller of claim 4, wherein each folding mechanism further comprises:
   a base member connected to a respective rear leg;

a first member support pivotally connected to the base member, the first member support having an extension axis and an offset connector spaced apart from the first member extension axis and moving in an arc as the first member support is pivoted;

a second member support pivotally connected to the base member, the second member support having an extension axis and an offset connector spaced apart from the second member extension axis; and a link member connecting the first member offset connector and the second member offset connector, the link member causing simultaneous pivotal movement of the second member support when the first member support is pivoted.

6. The foldable stroller frame of claim 5, wherein the first member support is connected to the front leg, the second member support is connected to the rear leg, and the first and second extension axes are generally aligned when the stroller frame is in the deployed position.

7. The foldable stroller frame of claim 6, further comprising a retainer for maintaining the frame in the deployed position, the retainer having an elongate articulated link connecting at opposing ends to one of the front legs and to one of the rear legs on at least one side of the frame, the articulated link having a first portion and a second portion with a pivot joint intermediately disposed to enable the articulated link to move between an extended orientation and a folded position, folding movement of the articulated link toward the folded position permitting the front leg and the rear leg to move toward the folded position, the articulated link further including a selectively releasable latch for retaining the link in the extended orientation, the latch being release by a handle configured to release the latch and enable the foldable frame to be lifted, lifting movement causing the stroller frame to move toward the folded position.

8. A foldable frame for a stroller comprising:
a front leg having a front wheel disposed at a distal end thereof;
a rear leg having a rear wheel disposed at a distal end thereof;
a handle support having a handle disposed at a distal end thereof;
a folding mechanism connecting proximal ends of the front leg, the rear leg, and the handle support in a manner enabling folding movement between a folded position and a deployed position;
a swivel assembly connecting the front wheel to the front leg, the swivel assembly enabling rotating movement of the front wheel about a generally upstanding swivel axis and having a cam surface sloped between a high point and a low point encircling the swivel axis, the swivel assembly further having a positioner moveable by an actuator in engaging and releasing directions that, when moved in the engaging direction, contacts the cam surface and rotates the front wheel toward a predetermined position, the actuator connecting to the folding mechanism to move the positioner to the engaged position when the stroller is moved from the deployed position toward the folded position.

9. The foldable frame of claim 8, wherein the positioner includes a spring to bias the positioner for movement in the engaging direction, the positioner, upon making contact with the cam surface when moving in the engaging direction, continues movement in the engaging direction causing the cam to rotate until the positioner rests at the low point at which no further movement in the engaging direction is permitted.

10. The foldable stroller of claim 9, wherein the folding mechanism further comprises:
a base member connected to the rear leg;
a first member support pivotally connected to the base member, the first member support having an extension axis and an offset connector spaced apart from the first member extension axis and moving in an arc as the first member support is pivoted;
a second member support pivotally connected to the base member, the second member support having an extension axis and an offset connector spaced apart from the second member extension axis; and
a link member connecting the first member offset connector and the second member offset connector, the link member causing simultaneous pivotal movement of the second member support when the first member support is pivoted.

11. The foldable stroller of claim 10, wherein the actuator is a cable connecting the first offset connector and the positioner, the cable being tensioned by the folding mechanism to move the positioner in the releasing direction as the stroller is moved toward the deployed position.

12. The foldable stroller of claim 10, wherein the link member further comprises:
a first link portion pivotally connected at one end to the first member offset connector; and
a second link portion pivotally connected at one end to the second member offset connector;
the opposite ends of the first and second link portions pivotally connected together at a link pivot point, the link pivot point being constrained to bi-directional movement in a guide structure formed in the base member, the first and second link portions causing simultaneous pivotal movement of the second member support when the first member support is pivoted.

13. A foldable stroller frame comprising:
a front leg having a front wheel disposed at a distal end thereof;
a rear leg having a rear wheel disposed at a distal end thereof;
a handle support having a handle disposed at a distal end thereof; and
a folding mechanism connecting proximal ends of the front leg, the rear leg, and the handle support, the folding mechanism having a base member connected to the rear leg, a first member support pivotally connected to the base member, the first member support having an extension axis and an offset connector spaced apart from the first member extension axis and moving in an arc as the first member support is pivoted, a second member support pivotally connected to the base member, the second member support having an extension axis and an offset connector spaced apart from the second member extension axis, and a link member connecting the first member offset connector and the second member offset connector, the link member causing simultaneous pivotal movement of the second member support when the first member support is pivoted.

14. The foldable stroller frame of claim 13, further comprising a swivel assembly connecting the front wheel to the front leg, the swivel assembly enabling rotating movement of the front wheel about a generally upstanding swivel axis, the swivel assembly further having a positioner moveable by an actuator in engaging and releasing directions and having a spring to bias movement thereof in the engaging direction, the positioner, when moved in the engaging direction, rotates the front wheel toward a predetermined position, the actuator connecting to the folding mechanism to move the positioner to the engaged position when the stroller is moved from the deployed position toward the folded position.

15. The foldable frame of claim 14, wherein the swivel assembly further includes a cam surface encircling the swivel axis, fixed in relation and aligned generally orthogonally thereto, the cam surface positioned to enable the positioner to contact the cam surface, the cam surface sloped between a high point and a low point, the positioner making contact with the cam surface when moving in the engaging direction, continued movement in the engaging direction causing the cam to rotate until the positioner rests at the low point at which no further movement in the engaging direction is permitted.

16. The foldable stroller of claim 15, wherein the actuator is a cable connecting the folding mechanism and the positioner, the cable being tensioned by the folding mechanism to move the positioner in the releasing direction as the stroller is moved toward the deployed position.

17. The foldable stroller frame of claim 15, wherein the caster mechanism further includes a cam surface encircling a general upright swivel axis, fixed in relation and aligned generally orthogonally thereto, the cam surface positioned to enable the plunger to contact the cam surface, the cam surface sloped between a high point and a low point, the plunger making contact with the cam surface when in the engaged position, continued movement in an engaging direction causing initial contact at the engaged position causing the cam to rotate until the plunger rests at the low point at which no further movement in the engaging direction is permitted.

18. The foldable stroller of claim 17, wherein the actuator is a cable tensioned by the folding mechanism as the stroller is moved toward the deployed position.

19. The foldable stroller of claim 18, wherein the plunger includes a biasing element to urge the plunger toward the engaged position when the actuator cable is detensioned.

* * * * *